US009779512B2

(12) United States Patent
Tomlin et al.

(10) Patent No.: US 9,779,512 B2
(45) Date of Patent: Oct. 3, 2017

(54) AUTOMATIC GENERATION OF VIRTUAL MATERIALS FROM REAL-WORLD MATERIALS

(71) Applicant: MICROSOFT TECHNOLOGY LICENSING, LLC, Redmond, WA (US)

(72) Inventors: Arthur C. Tomlin, Kirkland, WA (US); Roger Sebastian-Kevin Sylvan, Seattle, WA (US); Dan Kroymann, Kirkland, WA (US); Cameron G. Brown, Bellevue, WA (US); Nicholas Gervase Fajt, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/609,312

(22) Filed: Jan. 29, 2015

(65) Prior Publication Data

US 2016/0225164 A1    Aug. 4, 2016

(51) Int. Cl.
*G09G 5/02* (2006.01)
*G06T 7/40* (2017.01)
(Continued)

(52) U.S. Cl.
CPC .............. *G06T 7/40* (2013.01); *G02B 27/017* (2013.01); *G02B 27/0172* (2013.01);
(Continued)

(58) Field of Classification Search
CPC ....................................................... G06T 5/20
(Continued)

(56) References Cited

U.S. PATENT DOCUMENTS 6,750,873 B1 * 6/2004 Bernardini ............ G06T 7/0065
345/581
7,401,920 B1 * 7/2008 Kranz .................... A61B 3/113
351/209
(Continued)

FOREIGN PATENT DOCUMENTS

EP          2626837 A1    8/2013
WO     2006056592 A1    6/2006

OTHER PUBLICATIONS

"Surface Reconstruction and Display from Range and Color Data" Kari Pulli, Nokia Mobile Phones Research, Oulu, Finland and Linda G. Shapiro 1999.*
Lefebvre, et al., "Appearance-Space Texture Synthesis", In Proceedings of ACM Trans. Graphics, vol. 25, Issue 3, Retrieved on: Apr. 24, 2014, 1 page.
(Continued)

*Primary Examiner* — Javid A Amini
(74) *Attorney, Agent, or Firm* — Vierra Magen Marcus LLP

(57) ABSTRACT

Methods for automatically generating a texture exemplar that may be used for rendering virtual objects that appear to be made from the texture exemplar are described. In some embodiments, a head-mounted display device (HMD) may identify a real-world object within an environment, acquire a three-dimensional model of the real-world object, determine a portion of the real-world object from which a texture exemplar is to be generated, capture one or more images of the portion of the real-world object, determine an orientation of the real-world object, and generate the texture exemplar using the one or more images, the three-dimensional model, and the orientation of the real-world object. The HMD may then render and display images of a virtual object such that the virtual object appears to be made from a virtual material associated with the texture exemplar.

18 Claims, 11 Drawing Sheets

(51) Int. Cl.
  *G06T 15/04* (2011.01)
  *G06T 19/00* (2011.01)
  *G02B 27/01* (2006.01)
  *G06T 5/00* (2006.01)

(52) U.S. Cl.
  CPC .............. *G06T 5/006* (2013.01); *G06T 15/04* (2013.01); *G06T 19/006* (2013.01); *G02B 2027/014* (2013.01); *G02B 2027/0138* (2013.01); *G02B 2027/0178* (2013.01)

(58) Field of Classification Search
  USPC ......................................................... 345/633
  See application file for complete search history.

(56) References Cited

U.S. PATENT DOCUMENTS

| | | | | |
|---|---|---|---|---|
| 7,733,350 | B2* | 6/2010 | Lefebvre | G06T 11/001 345/582 |
| 7,817,161 | B2* | 10/2010 | Lefebvre | G06T 11/001 345/582 |
| 8,928,734 | B2* | 1/2015 | Dai | G06T 7/0073 345/420 |
| 2006/0204077 | A1* | 9/2006 | Lim | G06K 9/00771 382/154 |
| 2007/0132759 | A1 | 6/2007 | Mallick et al. | |
| 2010/0241998 | A1 | 9/2010 | Latta et al. | |
| 2012/0194644 | A1* | 8/2012 | Newcombe | G06T 7/20 348/46 |
| 2012/0306853 | A1 | 12/2012 | Wright et al. | |
| 2013/0208092 | A1* | 8/2013 | Rollet | H04N 13/0203 348/46 |
| 2013/0271625 | A1 | 10/2013 | Gruber et al. | |
| 2014/0044344 | A1 | 2/2014 | Bell et al. | |

OTHER PUBLICATIONS

Colombo, et al., "Shape Reconstruction and Texture Sampling by Active Rectification and Virtual View Synthesis", In Journal of Computer Vision and Image Understanding, vol. 115, Issue 2, Feb. 10, 2010, 37 pages.

Nishino, et al., "Eigen-Texture Method: Appearance Compression and Synthesis Based on a 3D Model", In Proceedings of IEEE Transactions on Pattern Analysis and Machine Intelligence, vol. 23, No. 11, Nov. 2001, pp. 1257-1265.

Lee, et al., "Modeling Real Objects Using Video See-through Augmented Reality", In Proceedings of Second International Symposium on Mixed Reality, Mar. 14, 2001, pp. 1-8.

Lok, et al., "Incorporating Dynamic Real Objects into Immersive Virtual Environments", In Proceedings of the symposium on Interactive 3D graphics, Apr. 27, 2003, pp. 31-40.

Janko, et al., "Creating Entirely Textured 3D Models of Real Objects Using Surface Flattening", In Machine Graphics & Vision International Journal, vol. 14, Issue 4, Jan. 2005, 19 pages.

Kim, et al., "Photometric Stereo for Dynamic Surface Orientations", In Proceedings of the European Conference on Computer Vision, Sep. 5, 2010, 14 pages.

"Second Written Opinion Issued in PCT Application No. PCT/US2016/014654", dated Jan. 11, 2017, 7 Pages. (MS# 355142-WO-PCT).

Liang, et al., "Real-Time Texture Synthesis by Patch-Based Sampling," ACM Transactions on Graphics, vol. 20, No. 3, Jul. 2001, pp. 127-150.

"International Search Report and Written Opinion Issued in PCT Application No. PCT/US2016/014654", dated Jun. 14, 2016, 12 Pages. (MS# 355142.02).

Chow, et al., "Specularity Removal and Relighting of 3D Object Model for Virtual Exhibition", In Proceedings of 19th International Conference on Pattern Recognition, Dec. 8, 2008, 4 Pages.

* cited by examiner

AUTOMATIC GENERATION OF VIRTUAL MATERIALS FROM REAL-WORLD MATERIALS

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system may perform several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular view associated with the mobile device to be augmented as the mobile device moves within the real-world environment.

SUMMARY

Technology is described for generating a texture exemplar or other texture image that may be used for rendering virtual objects that appear to be made from the texture exemplar. In some embodiments, a head-mounted display device (HMD) may identify a real-world object within an environment, acquire a three-dimensional model of the real-world object, determine a portion of the real-world object from which a texture exemplar is to be generated, capture one or more images of the portion of the real-world object, determine an orientation of the real-world object, and generate the texture exemplar using the one or more images, the three-dimensional model, and the orientation of the real-world object. The HMD may also identify one or more specular reflections within the one or more images, determine one or more locations corresponding with one or more sources of light within the environment, and generate the texture exemplar such that the one or more specular reflections and lighting variations due to the one or more sources of light are removed from the texture exemplar. The HMD may then render and display images of a virtual object such that the virtual object appears to be made from a virtual material associated with the texture exemplar.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
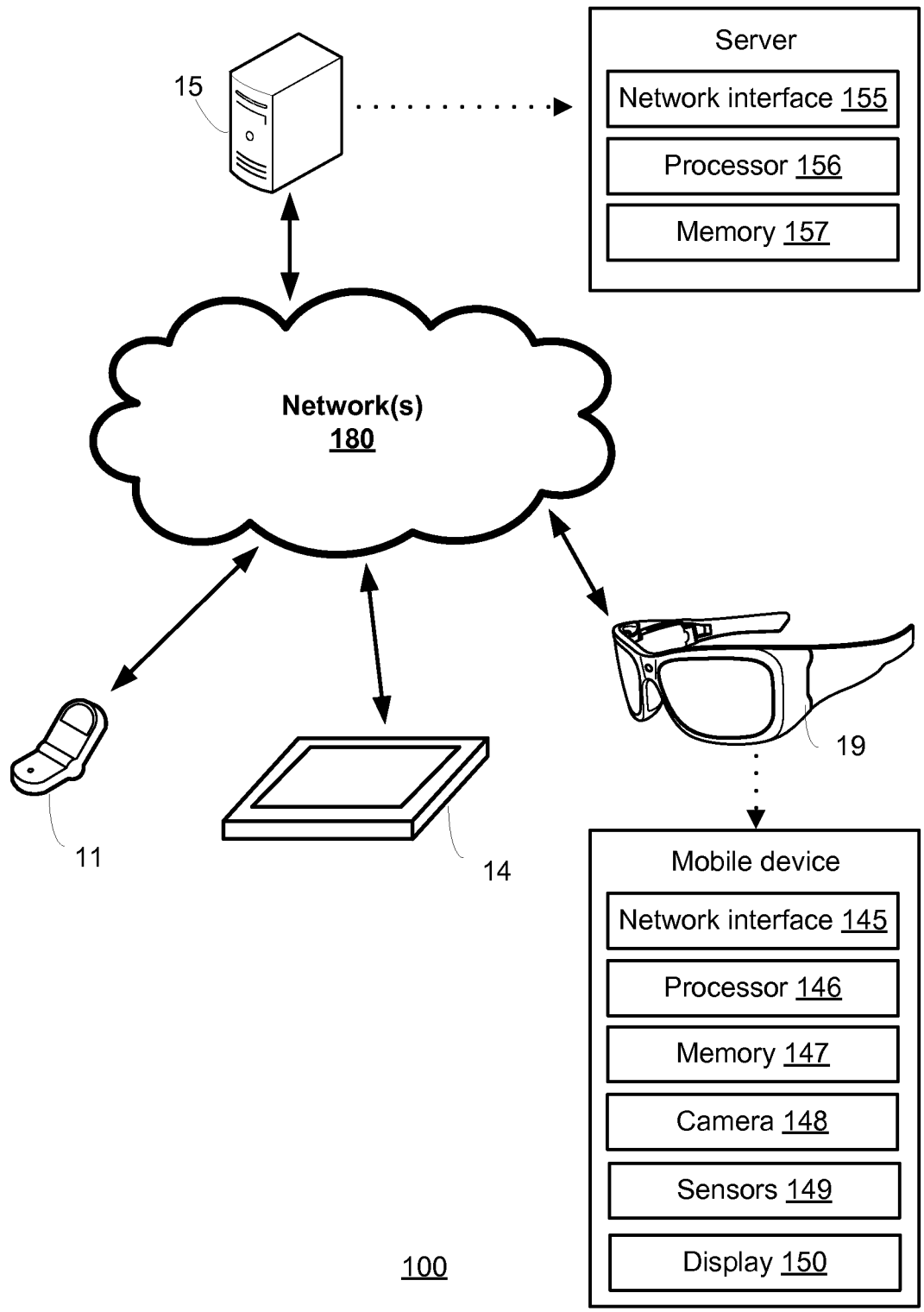
FIG. 1 is a block diagram of one embodiment of a networked computing environment in which the disclosed technology may be practiced.

Technology is described for automatically generating a texture exemplar (e.g., generating a two-dimensional texture image associated with a virtual material) that may be used for rendering virtual objects that appear to be made from the texture exemplar or that appear to be covered with a virtual material associated with the texture exemplar. In some embodiments, a head-mounted display device (HMD) may identify a real-world object within an environment, acquire a three-dimensional model of the real-world object, determine a portion of the real-world object from which a texture exemplar is to be generated, capture one or more images of the portion of the real-world object, determine an orientation of the real-world object, and generate the texture exemplar using the one or more images, the three-dimensional model, and the orientation of the real-world object. The HMD may also identify one or more specular reflections within the one or more images, determine one or more locations corresponding with one or more sources of light within the environment, and generate the texture exemplar such that the one or more specular reflections and lighting variations due to the one or more sources of light are removed from the texture exemplar. The HMD may then render and display images of a virtual object such that the virtual object appears to be made from a virtual material associated with the texture exemplar. Benefits of automatically generating the texture exemplar using an HMD include faster rendering and visualization of a virtual object and the ability to render the virtual object using the texture exemplar during runtime of an application.

In one embodiment, an end user of an HMD running an application with user created computer graphics (e.g., a virtual painting tool for virtual objects or an application that includes a user created virtual world) may select a portion of a real-world object (e.g., by placing a virtual bounding box around a portion of a chair, a ball, or a rug) from which a virtual material or texture may be derived. The end user may select the portion of the real-world object using hand gestures and/or a virtual camera viewfinder projected to the end user using the HMD. The HMD may automatically generate a texture image and render images of a virtual object using the texture image in response to the selection of the portion of the real-world object in real-time or during run-time of the application. In one example, the end user may select a portion of a soccer ball associated with a texture (e.g., the texture may include a pattern of black pentagons and white hexagons) and the HMD may render images of a virtual bunny rabbit such that the surface of the virtual bunny rabbit appears to be made from the selected texture. In this case, the HMD may acquire a three-dimensional model of the soccer ball (e.g., comprising a sphere) and unwarp or transform an image captured by the HMD of the portion of the soccer ball in order to generate a flattened two-dimensional image of the texture of the portion of the soccer ball (e.g., to undo the distortion caused by the curved surface of the soccer ball). In another example, the end user may select a portion of an object that includes reflective or shiny surfaces. In this case, the HMD may identify one or more specular reflections within one or more images of the portion of the object and remove the one or more specular reflections when generating the corresponding texture image. In some cases, a specular reflection may be identified by capturing two or more images of the portion of the object from two or more different angles or points of view, aligning the two or more images with each other, and identifying pixels within the two or more images that do not map to each other or do not have corresponding pixel values within a threshold pixel value range (e.g., the difference between pixel values is greater than 3% or greater than 5%). The identified pixel values may be replaced with interpolated pixel values based on neighboring pixel values within the images. The HMD may also compensate for lighting variation within an environment (e.g., non-uniform lighting due to the sun or other sources of light within the environment) by subtracting out the lighting variation from the texture image.

In some embodiments, an HMD may generate a virtual material or texture in which lighting variation caused by diffuse reflections (e.g., light reflecting off a colored wall and hitting a real-world object from which the virtual material or texture is derived) is reduced. The HMD may capture images of an environment (e.g., a room) and generate an environmental map of the environment that includes illuminance information for various regions and/or surfaces within the environment using the captured images. The environmental map may include locations of sources of light within the environment (e.g., due to lights within a room or sunlight entering a window of the room) and illuminance values for the various regions and/or surfaces within the environment. The environmental map may include a plurality of spherical harmonic projections centered at a centroid of a real-world object from which a virtual material or texture is to be derived. When generating the virtual material or texture, the geometric neighborhood for a particular location of the real-world object may be examined along with the surface normal to determine the hue of the incident lighting at the particular location. The HMD may then adjust one or more color pixel values corresponding with the particular location of the real-world object based on the hue of the incident lighting. In one example, the color of the generated texture corresponding with the particular location may be partially desaturated in the component of the hue of the incident lighting at the particular location.

In some embodiments, an HMD may extract or generate a virtual material or texture in which diffuse reflections hitting a real-world object from which the virtual material or texture is derived are identified and substantially removed from the virtual material or texture. In one example, a selected portion of a real-world object from which a virtual material or texture is to be derived may comprise a portion of a cube within a room. In this case, the HMD may generate an environmental map that includes illuminance information for a first wall of a red color and a second wall of a green color. When generating the virtual material or texture, for a first face of the cube facing the first wall, the red hue may be attenuated as the first face of the cube may be lit with red light from the first wall. Similarly, for a second face of the cube facing the second wall, the green hue may be attenuated as the second face of the cube may be lit with green light from the second wall. Thus, in some cases, the resulting texture may comprise a first portion in which the green hue has been attenuated and a second portion in which the red hue has been attenuated.

In some cases, an HMD may apply texture synthesis techniques to a texture image associated with a virtual material in order to render and display images of at least a portion of a virtual object covered with the virtual material in real-time. The texture synthesis techniques may include example-based texture synthesis techniques that take as input an exemplar (e.g., a sample image of the texture) and generate an output texture (e.g., an output image that is larger than the exemplar) that is visually similar to the exemplar. Texture synthesis may be isometric or anisometric. Isometric texture synthesis may be used to generate an output texture having the same pattern at the same scale and at the same orientation of the exemplar, while anisometric texture synthesis may allow for variation in the orientation and scaling of features in the generated texture. Texture synthesis techniques may include local region-growing methods and/or global optimization-based methods. Local region-growing methods may grow the output texture one pixel or patch at a time with the goal of maintaining coherence of the grown region with nearby pixels. However, with such approaches, small errors may accumulate over large distances leading to inconsistencies in the synthesized texture. Global synthesis methods may gradually develop the output texture as a whole using various criteria for evaluating similarity with the input exemplar, such as matching wavelet coefficients between input and output textures. More information regarding texture synthesis may be found in U.S. Pat. No. 7,817,161, entitled "Texture Synthesis Using Dimensionality-Reduced Appearance Space", issued Oct. 19, 2010, and U.S. Pat. No. 7,733,350, entitled "Anisometric Texture Synthesis," issued Jun. 8, 2010.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 14, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, and memory 157, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images of an environment. The mobile device 19 may include outward facing cameras that capture images of the environment and inward facing cameras that capture images of the end user of the mobile device. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may detect that a person has performed a particular gesture in order to control the computing device.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" may be used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room or a furniture store) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user may change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side).

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, a mobile device, such as mobile device 19, may comprise an HMD that identifies a real-world object (e.g., via a user selection of the real-world object or a user selection of a portion of the real-world object), acquires a three-dimensional model of the real-world object (e.g., comprising a virtual shape corresponding with the real-world object), determines a portion of the real-world object from which a texture exemplar is to be generated, captures one or more images of the portion of the real-world object (e.g., the one or more images may comprise one or more color images and/or one or more depth images), determines an orientation of the real-world object using surface recognition data from the one or more images, and generates the texture exemplar using the one or more images, the three-dimensional model, and the orientation of the real-world object. The mobile device may then render and display images of a virtual object such that the virtual object appears to be made from a virtual material associated with the texture exemplar.

Figure 2A:
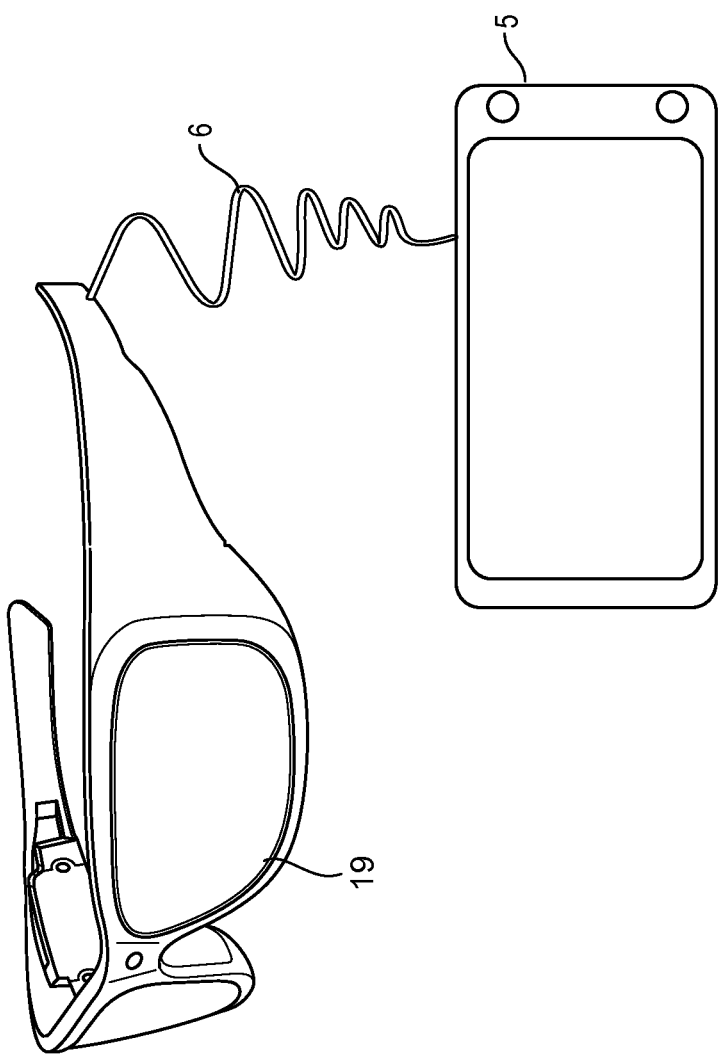
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data that may be used to provide an augmented reality environment on mobile device 19. Mobile device 5 may also provide motion and/or orientation information associated with mobile device 5 to mobile device 19. In one example, the motion information may include a velocity or acceleration associated with the mobile device 5 and the orientation information may include Euler angles, which provide rotational information around a particular coordinate system or frame of reference. In some cases, mobile device 5 may include a motion and orientation sensor, such as an inertial measurement unit (IMU), in order to acquire motion and/or orientation information associated with mobile device 5. The IMU may include a tri-axial accelerometer, a tri-axial gyro, and a tri-axial magnetic sensor. The mobile device 5 may determine an inertial frame using the IMU. The inertial reference frame may include an x-axis pointing North, a y-axis pointing East, and a z-axis pointing down towards the Earth.

In one embodiment, a mobile device, such as mobile device 5, may be positioned such that an orientation of the mobile device is held fixed (or substantially fixed) relative to the body of an end user of the mobile device. In one example, the mobile device may be positioned within a back pocket of pants or shorts worn by the end user. In another example, the mobile device may be positioned within a front pocket of a shirt or jacket worn by the end user. In another example, the mobile device may be strapped or clipped to a belt worn around the end user's waist. In these cases, an orientation of the mobile device relative to the end user's body may be determined using accelerometer and magnetometer data generated by the mobile device. The mobile device may generate a gravity vector or a vector that is orthogonal to a surface of the Earth based on the accelerometer and magnetometer data. The gravity vector may correspond with a vector that points towards the ground from a point on the mobile device. The mobile device may also generate a North vector or a vector that is orthogonal to the gravity vector and points in a northern direction based on the accelerometer and magnetometer data. In some cases, during a calibration step, the mobile device may determine a front facing vector by asking the end user to face North and align the front of their body with the North vector. The front facing vector may then move relative to a North-East-Down (NED) reference frame generated by the mobile device. In some embodiments, a mobile device, such as mobile device 19, may determine a gravity vector associated with the mobile device in order to determine an orientation of the mobile device.

Figure 2B:
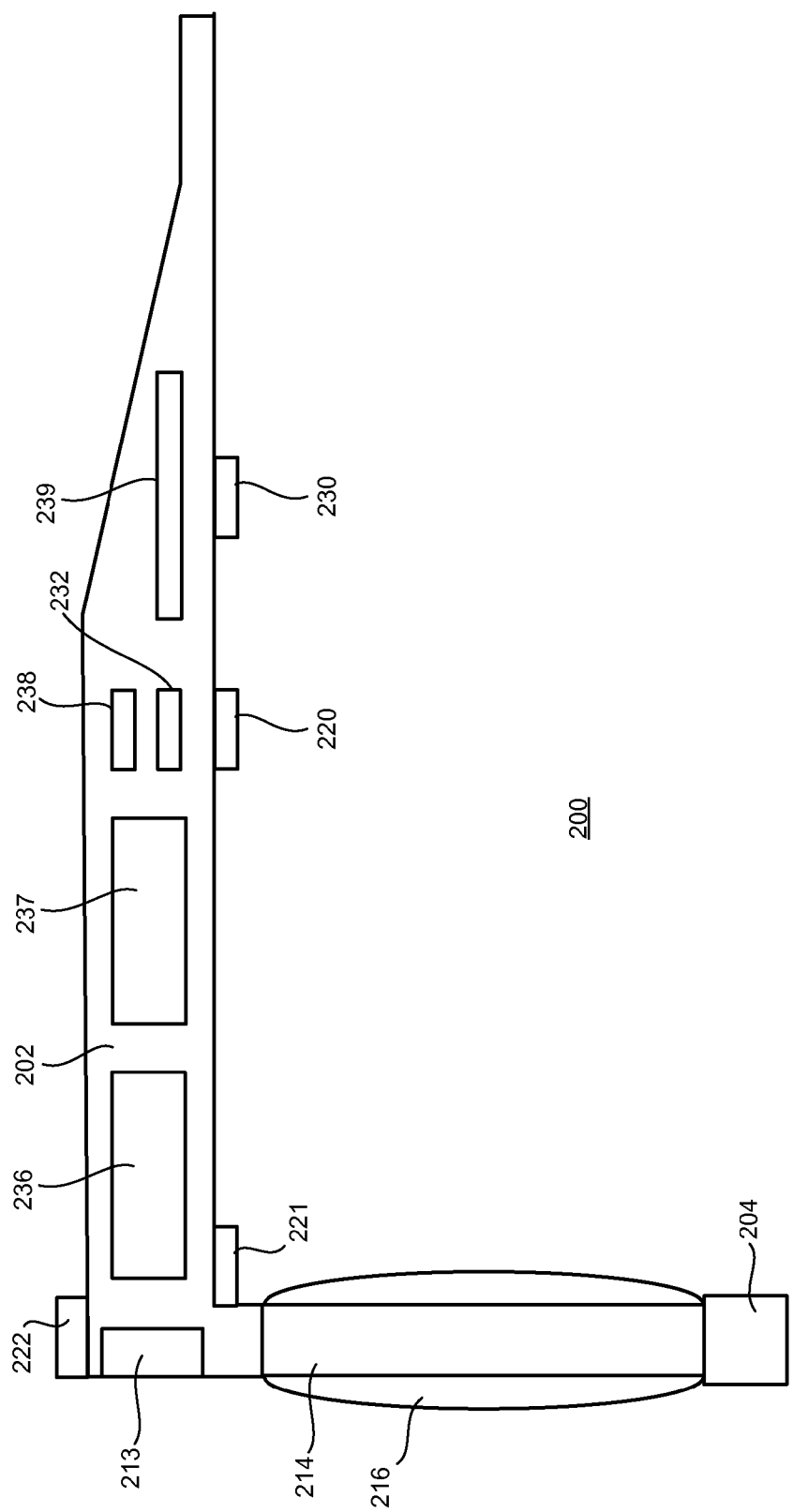
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, body facing camera 222, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include one or more inward facing cameras. The one or more inward facing cameras may capture images of an eye of an end user of the HMD. In another embodiment, the eye tracking system 221 may comprise an eye tracking illumination source and an associated eye tracking image sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011.

In one embodiment, the body facing camera 222 may include one or more downward facing cameras. The one or more downward facing cameras may capture images of a portion of a body of an end user of the HMD. For example, the one or more downward facing cameras may capture images of the end user's torso, chest, abdomen, or pelvic region. The images of the end user's body may be used to determine an orientation of the end user's body relative to the HMD. In one example, image processing techniques may be applied to the images of the end user's body to determine a direction that the end user's torso is facing relative to the HMD.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
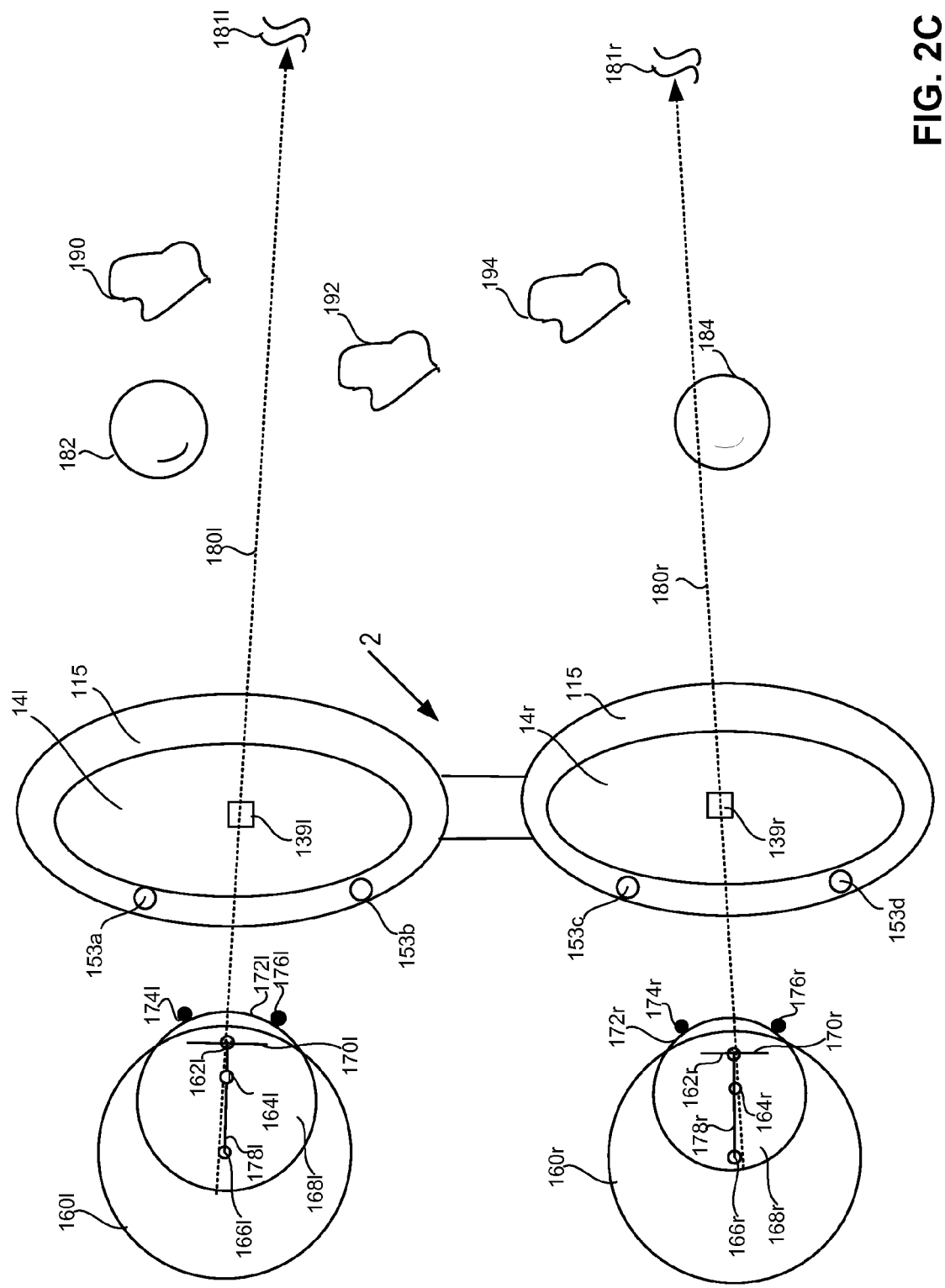
FIG. 2C depicts one embodiment of a portion of an HMD in which gaze vectors extending to a point of gaze are used for aligning a far inter-pupillary distance (IPD).

FIG. 2C depicts one embodiment of a portion of an HMD 2 in which gaze vectors extending to a point of gaze are used for aligning a far inter-pupillary distance (IPD). HMD 2 is one example of a mobile device, such as mobile device 19 in FIG. 1. As depicted, gaze vectors 180*l* and 180*r* intersect at a point of gaze that is far away from the end user (i.e., the gaze vectors 180*l* and 180*r* do not intersect as the end user is looking at an object far away). A model of the eyeball for eyeballs 160*l* and 160*r* is illustrated for each eye based on the Gullstrand schematic eye model. Each eyeball is modeled as a sphere with a center of rotation 166 and includes a cornea 168 modeled as a sphere having a center 164. The cornea 168 rotates with the eyeball, and the center of rotation 166 of the eyeball may be treated as a fixed point. The cornea 168 covers an iris 170 with a pupil 162 at its center. On the surface 172 of each cornea are glints 174 and 176.

As depicted in FIG. 2C, a sensor detection area 139 (i.e., 139*l* and 139*r*, respectively) is aligned with the optical axis of each display optical system 14 within an eyeglass frame 115. In one example, the sensor associated with the detection area may include one or more cameras capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d* on the right side of the frame 115. Through the display optical systems 14*l* and 14*r* in the eyeglass frame 115, the end user's field of view includes both real objects 190, 192, and 194 and virtual objects 182 and 184.

The axis 178 formed from the center of rotation 166 through the cornea center 164 to the pupil 162 comprises the optical axis of the eye. A gaze vector 180 may also be referred to as the line of sight or visual axis which extends from the fovea through the center of the pupil 162. In some embodiments, the optical axis is determined and a small correction is determined through user calibration to obtain the visual axis which is selected as the gaze vector. For each end user, a virtual object may be displayed by the display device at each of a number of predetermined positions at different horizontal and vertical positions. An optical axis may be computed for each eye during display of the object at each position, and a ray modeled as extending from the position into the user's eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

As depicted in FIG. 2C, the gaze vectors 180*l* and 180*r* are not perfectly parallel as the vectors become closer together as they extend from the eyeball into the field of view at a point of gaze. At each display optical system 14, the gaze vector 180 appears to intersect the optical axis upon which the sensor detection area 139 is centered. In this configuration, the optical axes are aligned with the inter-pupillary distance (IPD). When an end user is looking straight ahead, the IPD measured is also referred to as the far IPD.

Figure 2D:
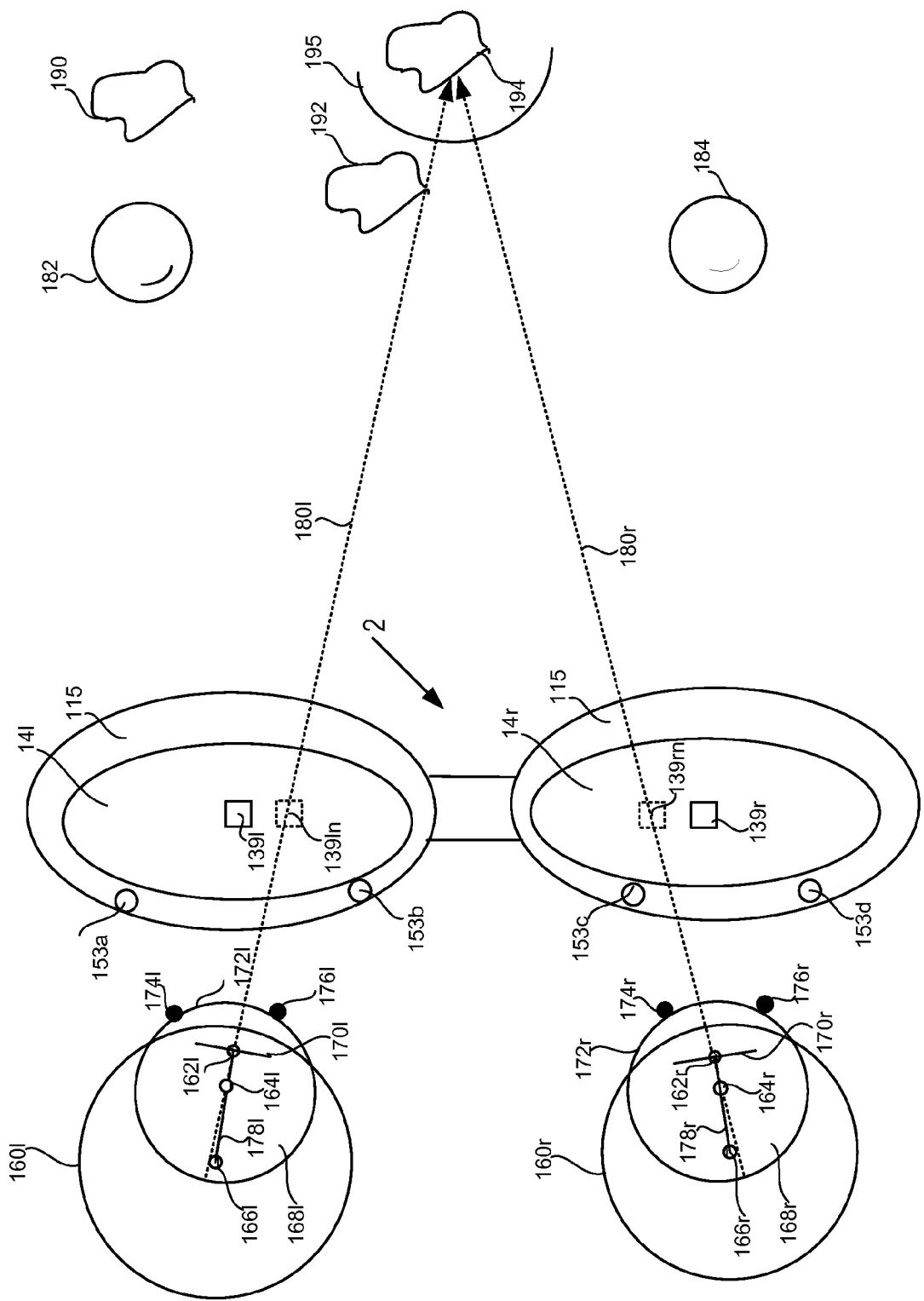
FIG. 2D depicts one embodiment of a portion of an HMD in which gaze vectors extending to a point of gaze are used for aligning a near inter-pupillary distance (IPD).

FIG. 2D depicts one embodiment of a portion of an HMD 2 in which gaze vectors extending to a point of gaze are used for aligning a near inter-pupillary distance (IPD). HMD 2 is one example of a mobile device, such as mobile device 19 in FIG. 1. As depicted, the cornea 168*l* of the left eye is rotated to the right or towards the end user's nose, and the cornea 168*r* of the right eye is rotated to the left or towards the end user's nose. Both pupils are gazing at a real object 194 within a particular distance of the end user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the end user is looking at real object 194. At such a distance, as the eyeballs rotate inward, the distance between their pupils decreases to a near IPD. The near IPD is typically about 4 mm less than the far IPD. A near IPD distance criteria (e.g., a point of gaze at less than four feet from the end user) may be used to switch or adjust the IPD alignment of the display optical systems 14 to that of the near IPD. For the near IPD, each display optical system 14 may be moved toward the end user's nose so the optical axis, and detection area 139, moves toward the nose a few millimeters as represented by detection areas 139*ln* and 139*rn*. More information about determining the IPD for an end user of an HMD and adjusting the display optical systems accordingly can be found in U.S. patent application Ser. No. 13/250,878, entitled "Personal Audio/Visual System," filed Sep. 30, 2011.

Figure 2E:
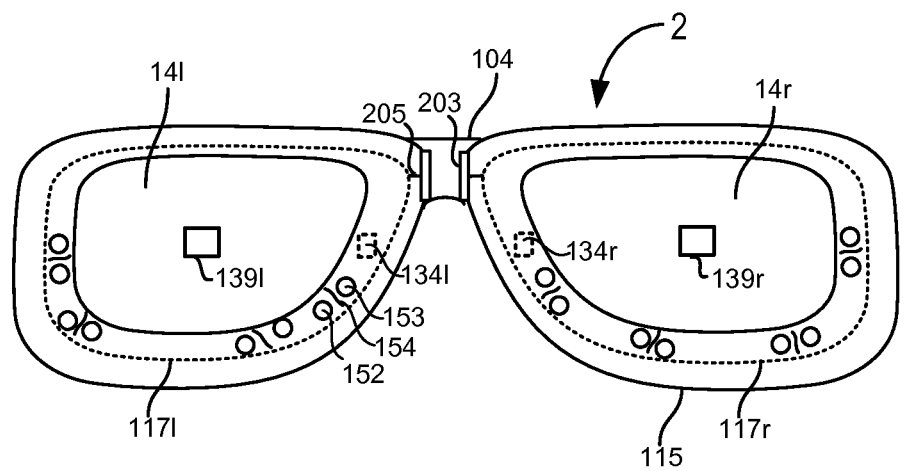
FIG. 2E depicts one embodiment of a portion of an HMD with movable display optical systems including gaze detection elements.

FIG. 2E depicts one embodiment of a portion of an HMD 2 with movable display optical systems including gaze detection elements. What appears as a lens for each eye represents a display optical system 14 for each eye (i.e., 14*l* and 14*r*). A display optical system includes a see-through lens and optical elements (e.g. mirrors, filters) for seamlessly fusing virtual content with the actual direct real world view seen through the lenses of the HMD. A display optical system 14 has an optical axis which is generally in the center of the see-through lens in which light is generally collimated to provide a distortionless view. For example, when an eye care professional fits an ordinary pair of eyeglasses to an end user's face, the glasses are usually fit such that they sit on the end user's nose at a position where each pupil is aligned with the center or optical axis of the respective lens resulting in generally collimated light reaching the end user's eye for a clear or distortionless view.

As depicted, a detection area 139r, 139l of at least one sensor is aligned with the optical axis of its respective display optical system 14r, 14l so that the center of the detection area 139r, 139l is capturing light along the optical axis. If the display optical system 14 is aligned with the end user's pupil, then each detection area 139 of the respective sensor 134 is aligned with the end user's pupil. Reflected light of the detection area 139 is transferred via one or more optical elements to the actual image sensor 134 of the camera, which in the embodiment depicted is illustrated by the dashed line as being inside the frame 115. In some embodiments, the sensor 134 may comprise an image sensor or RGB camera for capturing images of an end user's eyes or facial features surrounding the eyes. Other inward facing image sensors may also be integrated with the frame 115 in order to capture fixed facial features associated with the end user such as their nasal bridge.

In one embodiment, the at least one sensor 134 may be a visible light camera (e.g., an RGB or color camera). In one example, an optical element or light directing element comprises a visible light reflecting mirror which is partially transmissive and partially reflective. The visible light camera provides image data of the pupil of the end user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera may not be sensitive to the virtual image reflections on the eye.

In another embodiment, the at least one sensor 134 (i.e., 134l and 134r) is an IR camera or a position sensitive detector (PSD) to which the IR radiation may be directed. The IR radiation reflected from the eye may be from incident radiation of the illuminators 153, other IR illuminators (not shown), or from ambient IR radiation reflected off the eye. In some cases, sensor 134 may be a combination of an RGB and an IR camera, and the light directing elements may include a visible light reflecting or diverting element and an IR radiation reflecting or diverting element. In some cases, the sensor 134 may be embedded within a lens of the system 14. Additionally, an image filtering technique may be applied to blend the camera into a user field of view to lessen any distraction to the user.

As depicted in FIG. 2E, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In some embodiments where the sensor is an IR camera or IR position sensitive detector (PSD), the photo-detectors may include additional data capture devices and may also be used to monitor the operation of the illuminators, e.g. wavelength drift, beam width changes, etc. The photodetectors may also provide glint data with a visible light camera as the sensor 134.

Each display optical system 14 and its arrangement of gaze detection elements facing each eye (e.g., such as camera 134 and its detection area 139, the illuminators 153, and photodetectors 152) may be located on a movable inner frame portion 117l, 117r. In this example, a display adjustment mechanism comprises one or more motors 203 having a shaft 205 which attaches to the inner frame portion 117 which slides from left to right or vice versa within the frame 115 under the guidance and power of shafts 205 driven by motors 203. In some embodiments, one motor 203 may drive both inner frames.

Figure 2F:
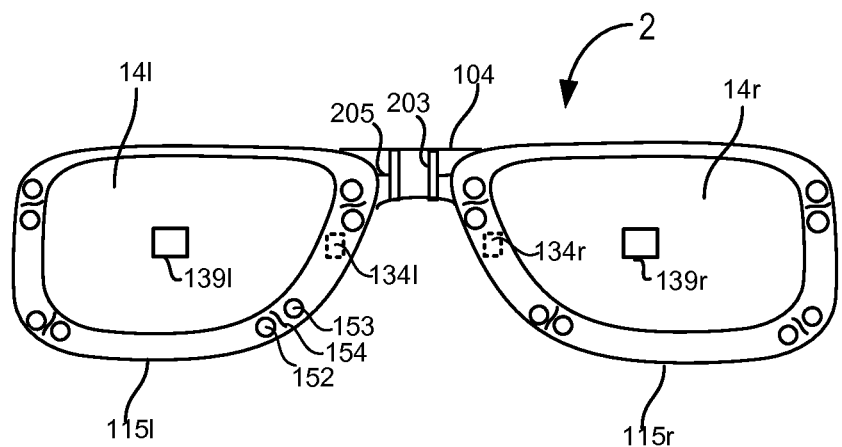
FIG. 2F depicts an alternative embodiment of a portion of an HMD with movable display optical systems including gaze detection elements.

FIG. 2F depicts an alternative embodiment of a portion of an HMD 2 with movable display optical systems including gaze detection elements. As depicted, each display optical system 14 is enclosed in a separate frame portion 115l, 115r. Each of the frame portions may be moved separately by the motors 203. In some embodiments, the at least one sensor 134 may comprise an image sensor or RGB camera for capturing images of an end user's eyes or facial features surrounding the eyes. Other inward facing image sensors may be integrated with the frame 115 in order to capture fixed facial features associated with the end user such as their nasal bridge.

Figure 3:
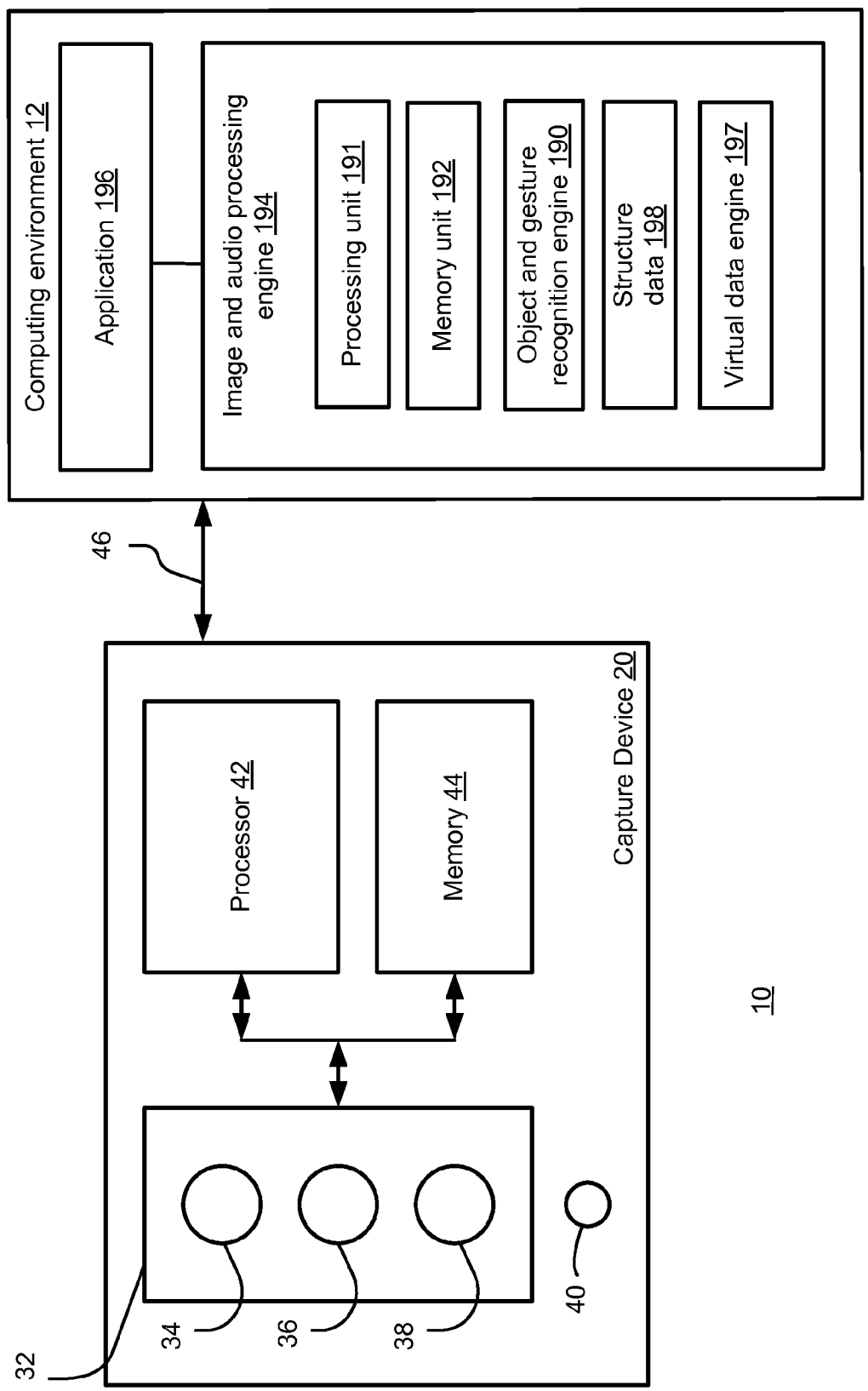
FIG. 3 depicts one embodiment of a computing system including a capture device and computing environment.

FIG. 3 depicts one embodiment of a computing system 10 including a capture device 20 and computing environment 12. In some embodiments, capture device 20 and computing environment 12 may be integrated within a single mobile computing device. The single integrated mobile computing device may comprise a mobile device, such as mobile device 19 in FIG. 1. In one example, the capture device 20 and computing environment 12 may be integrated within an HMD. In other embodiments, capture device 20 may be integrated with a first mobile device, such as mobile device 19 in FIG. 2A, and computing environment 12 may be integrated with a second mobile device in communication with the first mobile device, such as mobile device 5 in FIG. 2A.

In one embodiment, the capture device 20 may include one or more image sensors for capturing images and videos. An image sensor may comprise a CCD image sensor or a CMOS image sensor. In some embodiments, capture device 20 may include an image sensor and/or an IR CMOS image sensor. The capture device 20 may include an image camera component 32. The image camera component 32 may include an IR light component 34, a depth camera 36, and an RGB camera 38 that may be used to capture the depth image of a capture area. In one example, the IR light component 34 of the capture device 20 may emit an infrared light into the capture area and may then use sensors to detect the back-scattered light from the surface of one or more objects in the capture area using the color and/or IR light sensing components within the image camera component 32. In some embodiments, pulsed infrared light may be used such that the time between an outgoing light pulse and a corresponding incoming light pulse may be measured and used to determine a physical distance from the capture device 20 to a particular location on the one or more objects in the capture area. Capture device 20 may also include optics for producing collimated light and/or for diffusing light (e.g., an optical diffuser for spreading light from an IR light source that generates a narrow beam of light) for illuminating an environment.

As depicted in FIG. 3, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor 42 may include a standardized processor, a specialized processor, a microprocessor, or the like. The processor 42 may execute instructions that may include instructions for receiving and analyzing images and/or determining whether a particular gesture has occurred (e.g., end user gestures for controlling or manipulating a virtual object). It is to be understood that at least some image analysis and/or gesture recognition operations may be executed by processors contained within one or more capture devices such as capture device 20.

The capture device 20 may include a memory 44 that may store the instructions that may be executed by the processor 42 and images (or frames of images) captured by the light sensing components of the image camera component 32. In one example, the memory 44 may include random access memory (RAM), read only memory (ROM), cache, Flash memory, a non-volatile memory, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection or a wireless connection such as a wireless 802.11 b, g, a, or n connection. In one embodiment, the capture device 20 may provide the images captured by, for example, the depth camera 36 and/or the RGB camera 38 to the computing environment 12 via the communication link 46.

As depicted in FIG. 3, computing environment 12 includes image and audio processing engine 194 in communication with application 196. Application 196 may comprise an operating system application or other computing application such as a computer graphics application, a messaging application, or an application for generating an augmented reality environment. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190.

Virtual data engine 197 processes virtual objects and registers the position and orientation of virtual objects in relation to various maps of a real-world environment stored in memory unit 192. The virtual data engine may also render images associated with virtual objects for display to an end user of computing system 10. In some embodiments, the computing system 10 may use images acquired from the capture device 20 to determine a six degree of freedom (6DOF) pose corresponding with the images relative to a 3D map of an environment. In one example, a 6DOF pose may comprise information associated with the position and orientation of a mobile device (e.g., an HMD) within the environment. The 6DOF pose may be used for localizing a mobile device and to generate images of virtual objects such that the virtual objects appear to exist at appropriate locations within an augmented reality environment. More information regarding performing pose estimation and/or localization for a mobile device can be found in U.S. patent application Ser. No. 13/017,474, "Mobile Camera Localization Using Depth Maps."

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., a pencil held by an end user of an HMD) and facial recognition may be used to detect the face of a particular person within an environment. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts (e.g., arms, hands, and/or fingers). In another example, structure data 198 may include structural information regarding one or more inanimate objects in order to help recognize the one or more inanimate objects (e.g., a pencil or stylus).

The image and audio processing engine 194 may also utilize object and gesture recognition engine 190 while performing gesture recognition. In one example, object and gesture recognition engine 190 may include a collection of gesture filters, each comprising information concerning a gesture that may be performed. The object and gesture recognition engine 190 may compare the data captured by capture device 20 to the gesture filters in a gesture library to identify when a user has performed one or more gestures. In one example, image and audio processing engine 194 may use the object and gesture recognition engine 190 to detect the performance of a particular gesture performed by an end user of the computing system 10 (e.g., an object selection gesture). In one embodiment, the object and gesture recognition engine 190 may utilize machine learning classification techniques.

Figure 4A:
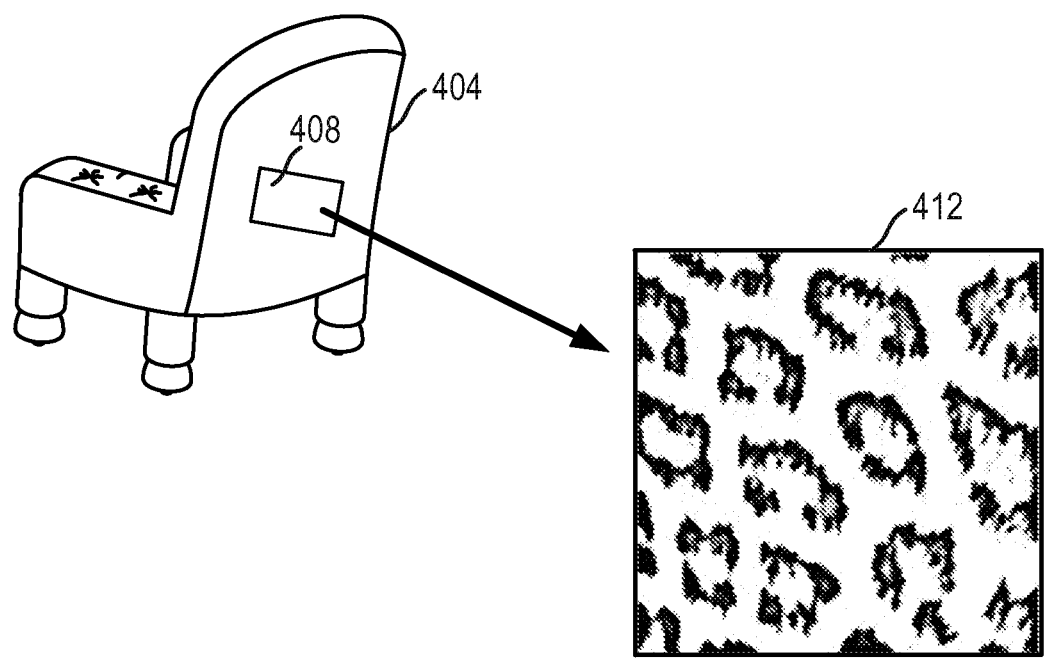
FIG. 4A depicts one embodiment of a portion of a real-world object from which a texture exemplar may be derived.

FIG. 4A depicts one embodiment of a portion 408 of a real-world object 404 from which a texture exemplar 412 may be derived. The texture exemplar 412 may depict the appearance of a virtual material. In some cases, the virtual material may comprise a rough surface, a smooth surface, or smooth glossy surface. The virtual material may correspond with a real-world material such as a portion of a grass surface, a portion of a rug, a portion of a fabric on the back of a chair, a portion of a striped or spotted animal, a portion of a sand beach, or a portion of a brick wall.

As depicted, the real-world object 404 comprises a chair and the portion 408 of the real-world object 404 comprises a portion of the back side of the chair. The portion 408 may be selected or identified by an end user of an HMD by the end user controlling the HMD to select and capture an image of the portion 408. In some cases, the end user may capture the image of the portion 408 using a virtual camera viewfinder projected to the end user of the HMD. The texture exemplar 412 may comprise a two-dimensional texture image that is generated using one or more images of the portion 408 of the real-world object 404. The texture image may comprise a color image or a black and white image. The texture image may include texture information associated with the spatial arrangement of colors and/or intensities within the one or more images of the portion 408 of the real-world object 404. The intensities may include color intensities and/or greyscale intensities. The texture image may include a set of texture elements or surface texels that occur in a regular or repeating pattern or that are arranged in a particular spatial relationship. In one example, a first image of the one or more images may be captured using the HMD from a first angle (or a first point of view within an environment) and a second image of the one or more images may be captured using the HMD from a second angle different from the first angle. The first image and the second image may be mapped to the selected portion of the real-world object and the overlapping images may then be used to generate the texture image that is used as an input to a texture synthesis application for rendering virtual objects that appear to be made from a virtual material associated with the texture image.

Figure 4B:
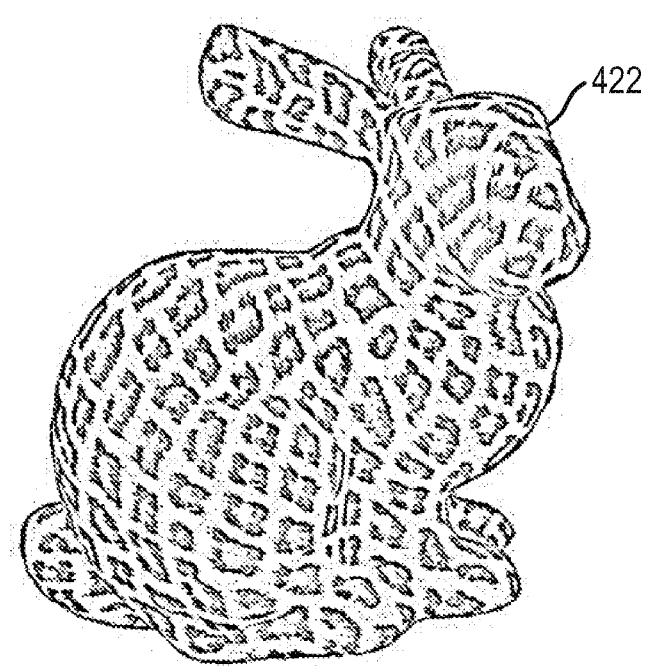
FIG. 4B depicts one embodiment of a virtual object that has been generated such that the surface of the virtual object appears to comprise a texture associated with the texture exemplar depicted in FIG. 4A.

FIG. 4B depicts one embodiment of a virtual object 422 that has been generated such that the surface of the virtual object 422 appears to comprise a texture associated with the texture exemplar 412 in FIG. 4A. As depicted, the texture exemplar 412 may comprise a leopard texture and the virtual object 422 may comprise a virtual bunny rabbit that is generated such that the surface of the virtual bunny rabbit appears to comprise the leopard texture from the texture exemplar 412. In some cases, the two-dimensional texture described by the texture exemplar 412 may be mapped onto the surface of the virtual object 422 using a texture synthesis operation. The texture synthesis operation may include one or more image warping operations. In one example, the one or more image warping operations may include a first set of operations for mapping a two-dimensional texture image onto a three-dimensional space of the virtual object or onto a curved surface of the virtual object and a second set of operations associated with projective transformations from the surface of the virtual object into a two-dimensional screen space for displaying the virtual object using an HMD. In this case, an end user of the HMD may move around an augmented reality environment and perceive that the surface of a virtual bunny rabbit is made from the leopard texture of the texture exemplar 412.

Figure 5A:
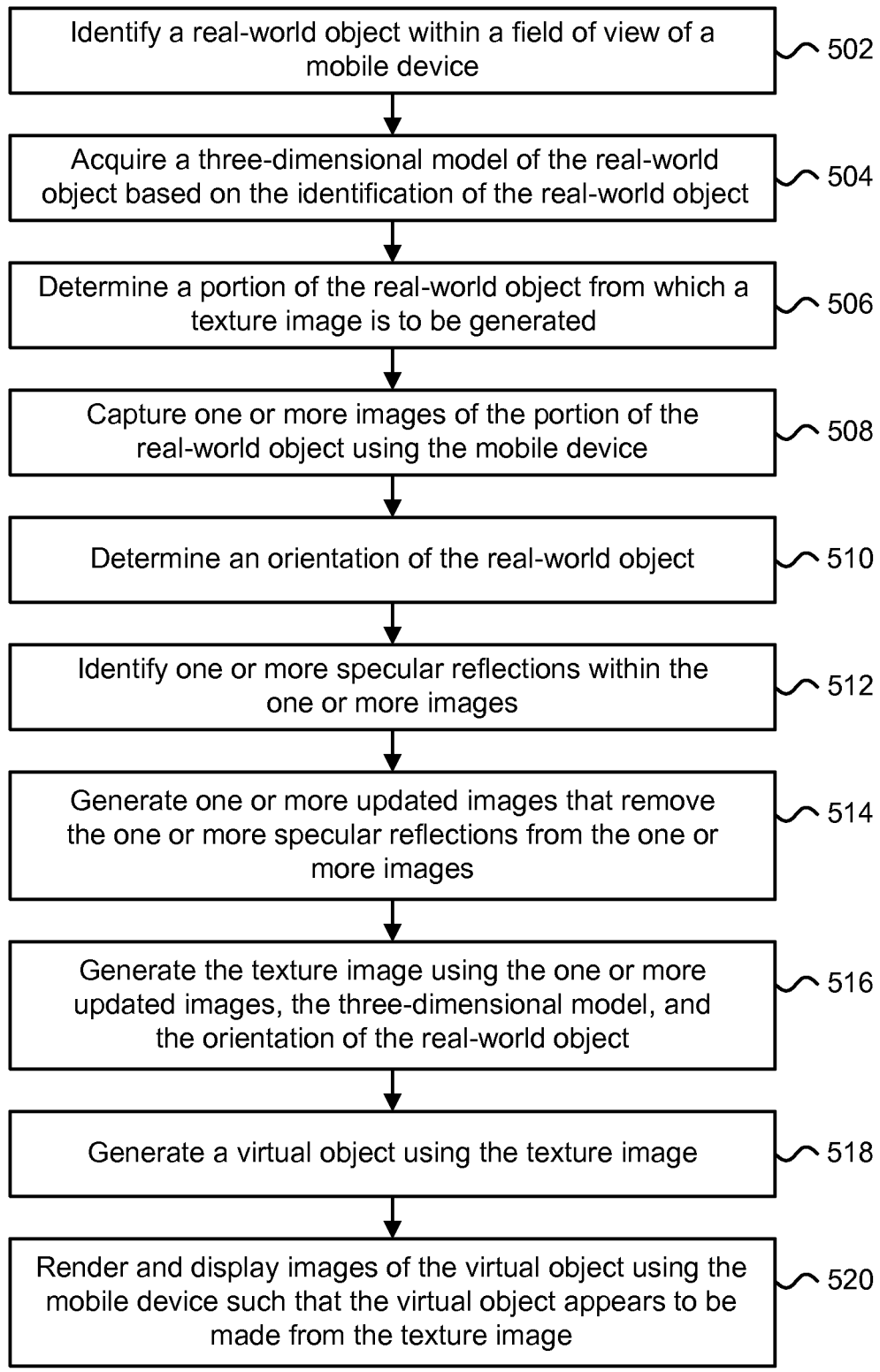
FIG. 5A is a flowchart describing one embodiment of a method for generating and displaying a virtual object using a texture exemplar.

FIG. 5A is a flowchart describing one embodiment of a method for generating and displaying a virtual object using a texture exemplar. In one embodiment, the process of FIG. 5A may be performed by a mobile device, such as mobile device 19 in FIG. 1.

In step 502, a real-world object is identified within a field of view of a mobile device. The mobile device may comprise an HMD. The real-world object may be identified by an end user of the HMD using hand gestures and/or finger gestures to identify the real-world object. The real-world object may comprise, for example, a chair, a soccer ball, a basketball, a couch, a piece of furniture, or a wall covered with wallpaper. In one embodiment, the real-world object may be identified by applying object recognition techniques, edge detection techniques, feature detection techniques, and segmentation techniques to color and/or depth images captured using the mobile device.

In step 504, a three-dimensional model of the real-world object is acquired based on the identification of the real-world object. In one embodiment, the three-dimensional model may be acquired from a server, such as server 15 in FIG. 1. The three-dimensional model may comprise a three-dimensional shape such as a rectangular prism, a cube, a triangular prism, a square pyramid, a cylinder, a cone, or a sphere. In some embodiments, the real-world object may comprise a three-dimensional object and the mobile device may capture a plurality of images of the real-world object from varying points of view in order to scan the real-world object and to generate the three-dimensional model of the real-world object. The three-dimensional model may comprise a three-dimensional shape that is determined using surface reconstruction techniques. The shape of the real-world object may be determined via registration of landmarks within the multiple views of the real-world object associated with the plurality of images of the real-world object taken from the varying points of view.

In step 506, a portion of the real-world object from which a texture image is to be generated is determined. In some cases, the end user of an HMD may select a portion of the real-world object using a virtual camera viewfinder that may be resized using finger gestures and a voice command to select or capture the portion of the real-world object within the virtual camera viewfinder at the time that the voice command is issued. In step 508, one or more images of the portion of the real-world object are captured using the mobile device. The one or more images may include one or more color images and/or one or more depth images. In step 510, an orientation of the real-world object or an orientation of a captured surface of the real-world object relative to the mobile device is determined. The orientation of the real-world object or the orientation of a captured surface may be determined using the three-dimensional model of the real-world object. The orientation information may be used to realign images or reproject images such that the captured images are aligned to a camera used by the mobile device for capturing the one or more images.

In step 512, one or more specular reflections are identified within the one or more images. In this case, an HMD may identify one or more specular reflections within the one or more images and remove the one or more specular reflections when generating the corresponding texture image. In some cases, the one or more specular reflections may be identified by capturing two or more images of the portion of the real-world object from two or more different angles or points of view, aligning the two or more images with each other, and identifying pixels within the two or more images that do not map to each other or do not have corresponding pixel values within a threshold pixel value range (e.g., the difference between pixel colors or intensities is greater than 10%). The identified pixel values may be replaced with interpolated pixel values based on neighboring pixel values within the two or more images.

In step 514, one or more updated images that remove the one or more specular reflections from the one or more images are generated. The one or more updated images may be generated such that the one or more specular reflections are substantially removed from the one or more images or such that specular and/or diffuse reflections appearing within the one or more images are substantially mitigated. In step 516, the texture image is generated using the one or more updated images, the three-dimensional model of the real-world object, and the orientation of the real-world object. The texture image may be generated by unwarping or transforming the one or more updated images using the three-dimensional model of the real-world object such that a flattened two-dimensional image is generated. In one example, an image of a portion of a soccer ball may be reprojected such that the distortions to the texture of the soccer ball caused by the curved surface of the soccer ball (due to the soccer ball being a sphere) are corrected and a texture image associated with a flattened surface of the soccer ball is generated. The texture image may also be generated such that distortions to the texture caused by the one or more images not being captured head-on or not being captured from a point of view that is not orthogonal to a surface associated with the portion of the real-world object are corrected. In one example, if the portion of the real-world object corresponds with a portion of a wall covered with wallpaper, then the texture of the wallpaper may be distorted if the one or more images of the wallpaper are taken at an angle that is not orthogonal to the surface of the wall. In this case, the texture image may be generated by unwarping or transforming the one or more updated images such that the texture image comprises a texture of the wallpaper that appears to have been captured from a point of view that is orthogonal to the surface of the wall.

In step 518, a virtual object is generated using the texture image. In step 520, images of the virtual object are rendered and displayed using the mobile device such that the virtual object appears to be made from the texture image or from a virtual material associated with the texture image. The images displayed using the mobile device may be generated by applying texture synthesis techniques to the texture image in order to render and display images of at least a portion of the virtual object covered with a virtual material associated with the texture image. In some cases, an HMD may render and display images of the virtual object such that a surface of the virtual object appears to be made from the virtual material during runtime of an application. In one example, the application may comprise an application that allows the end user of the HMD to create virtual objects within an augmented reality environment displayed to the end user or displayed to other end users of other HMDs. In this case, the end user may select a portion of a real-world object (e.g., a portion of a soccer ball) using a virtual camera viewfinder projected to the end user and view a virtual object (e.g., a virtual cube or a virtual animal) covered in a virtual material or texture corresponding with the selected portion of the real-world object in real-time or during run-time of the application.

Figure 5B:
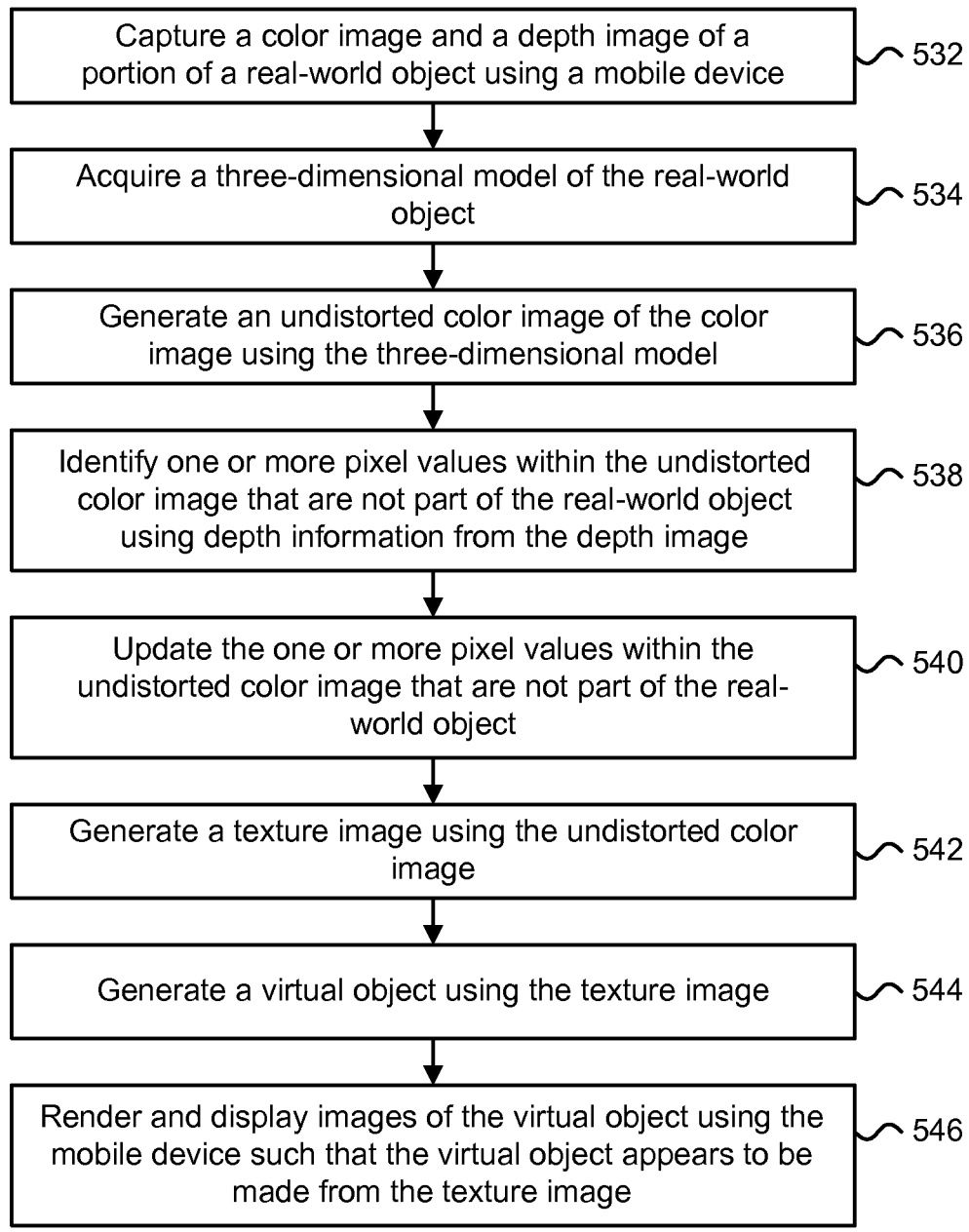
FIG. 5B is a flowchart describing an alternative embodiment of a method for generating and displaying a virtual object using a texture exemplar.

FIG. 5B is a flowchart describing an alternative embodiment of a method for generating and displaying a virtual object using a texture exemplar. In one embodiment, the process of FIG. 5B may be performed by a mobile device, such as mobile device 19 in FIG. 1.

In step 532, a color image and a depth image of a portion of a real-world object are captured using a mobile device. The mobile device may comprise an HMD. In some cases, the portion of the real-world object may comprise a portion of a rug, a portion of a wall covered in wallpaper, or a portion of a soccer ball. The color image may be captured using a color camera embedded within the mobile device and the depth image may be captured using a depth camera that is embedded within the mobile device.

In step 534, a three-dimensional model of the real-world object is acquired. In one embodiment, the three-dimensional model may be acquired from a server, such as server 15 in FIG. 1. The three-dimensional model may comprise a three-dimensional shape such as a rectangular prism, a cube, a triangular prism, a square pyramid, a cylinder, a cone, or a sphere. In some embodiments, the real-world object may comprise a three-dimensional object and the mobile device may capture a plurality of images of the real-world object from varying points of view in order to scan the real-world object and to generate the three-dimensional model of the real-world object. The three-dimensional model may comprise a three-dimensional shape that is determined using surface reconstruction techniques. The surface reconstruction techniques may include implicit reconstruction techniques or parametric reconstruction techniques. The three-dimensional model may include a parametric surface or a triangulated surface mesh. The shape of the real-world object may be determined via registration of landmarks within the multiple views of the real-world object associated with the plurality of images of the real-world object taken from the varying points of view.

In step 536, an undistorted color image of the color image is generated using the three-dimensional model. In some embodiments, the undistorted color image may be generated by unwarping or transforming the color image using the three-dimensional model of the real-world object such that a flattened two-dimensional image is generated. In one example, a color image of a portion of a soccer ball may be reprojected such that the distortions to the texture of the soccer ball caused by the curved surface of the soccer ball (due to the soccer ball being a sphere) are corrected and an undistorted color image associated with a flattened surface of the soccer ball is generated.

In step 538, one or more pixel values within the undistorted color image that are not part of the real-world object are identified using depth information from the depth image. In one embodiment, the one or more pixel values within the undistorted color image that are not part of the real-world object may be identified based on depth values that do not correspond with a location of the real-world object within an environment. In one example, the color image captured using the mobile device may include a portion of a wall covered with wallpaper and a second object (e.g., a person or a plant) that is located between the mobile device capturing the color image and the selected real-world object. In this case, pixel values associated with the second object may be identified and replaced with interpolated pixel values that are interpolated using neighboring pixel values within the undistorted color image that are identified as belonging to the real-world object. The pixel values associated with the second object may be identified using image segmentation techniques or by identifying pixels within the color image corresponding with depth values that are outside of an allowable depth value range for pixels associated with the portion of the real-world object (e.g., the depth values correspond with distances that are closer to the mobile device than the real-world object by a threshold distance, such as two feet closer to the mobile device).

In step 540, the one or more pixel values within the undistorted color image that are not part of the real-world object are updated. The one or more pixel values may be updated with interpolated pixel values that are derived from neighboring pixel values within the undistorted color image that are identified as belonging to the portion of the real-world object. In step 542, a texture image is generated using the undistorted color image. In some cases, the texture image may be generated by removing specular reflections from the undistorted color image and/or by applying image reprojection techniques to the undistorted color image such that the texture image comprises a texture that appears to have been captured from a point of view that is orthogonal to a surface of the portion of the real-world object. In some cases, the image reprojection techniques may include single plane transformations or affine transformations.

In step 544, a virtual object is generated using the texture image. In step 546, images of the virtual object are rendered and displayed using the mobile device such that the virtual object appears to be made from the texture image or from a virtual material associated with the texture image. The images displayed using the mobile device may be generated by applying texture synthesis techniques to the texture image to render and display images of at least a portion of the virtual object covered with a virtual material associated with the texture image. In some cases, an HMD may render and display images of the virtual object such that a surface of the virtual object appears to be covered with the virtual material during runtime of an application. In one example, the application may comprise an application that allows the end user of the HMD to create virtual objects within an augmented reality environment using virtual materials derived from real-world objects in real-time.

One embodiment of the disclosed technology includes one or more processors in communication with a see-through display. The one or more processors acquire one or more images of a portion of a real-world object and acquire a three-dimensional model of the real-world object. The one or more processors identify one or more specular reflections within the one or more images and generate a texture exemplar using the one or more images and the three-dimensional model of the real-world object. The one or more processors generate the texture exemplar such that the one or more specular reflections do not exist within the texture exemplar. The one or more processors generate the texture exemplar such that distortions caused by a curved surface of the real-world object are corrected. The one or more processors render images of a virtual object such that the virtual object appears to be at least partially covered with a virtual material corresponding with the texture exemplar. The see-through display displays the rendered images.

One embodiment of the disclosed technology comprises a method for generating and controlling virtual objects including capturing one or more images of a portion of a real-world object using a mobile device, acquiring a three-dimensional model of the real-world object, identifying one or more specular reflections within the one or more images, and generating a texture exemplar using the one or more images and the three-dimensional model of the real-world object. The texture exemplar is generated such that the one or more specular reflections do not exist within the texture exemplar. The method further comprises rendering and displaying images of a virtual object using the mobile device such that the virtual object appears to be at least partially covered with a virtual material corresponding with the texture exemplar.

In some embodiments, the method further comprises unwarping the one or more images using the three-dimensional model of the real-world object such that distortions caused by a curved surface of the real-world object are corrected. The one or more images may include a color image and a depth image. The method may further comprise identifying one or more pixel values within the color image that are not part of the real-world object using depth information from the depth image and updating the one or more pixel values within the color image that are not part of the real-world object with interpolated pixel values derived from other pixel values within the color image that are part of the real-world object.

One embodiment of the disclosed technology comprises one or more storage devices containing processor readable code for programming one or more processors to perform a method for generating and controlling virtual objects within an augmented reality environment using a head-mounted display device. The processor readable code comprising processor readable code configured to capture one or more images of a portion of a real-world object using the head-mounted display device, configured to acquire a three-dimensional model of the real-world object, configured to identify one or more specular reflections within the one or more images, and configured to generate a texture exemplar using the one or more images and the three-dimensional model of the real-world object. The texture exemplar is generated such that the one or more specular reflections do not exist within the texture exemplar. The texture exemplar is generated such that distortions caused by a curved surface of the real-world object are corrected using the three-dimensional model of the real-world object. The processor readable code comprising processor readable code configured to render and display images of a virtual object using the head-mounted display device such that the virtual object appears to be at least partially covered with a virtual material corresponding with the texture exemplar.

Figure 6:
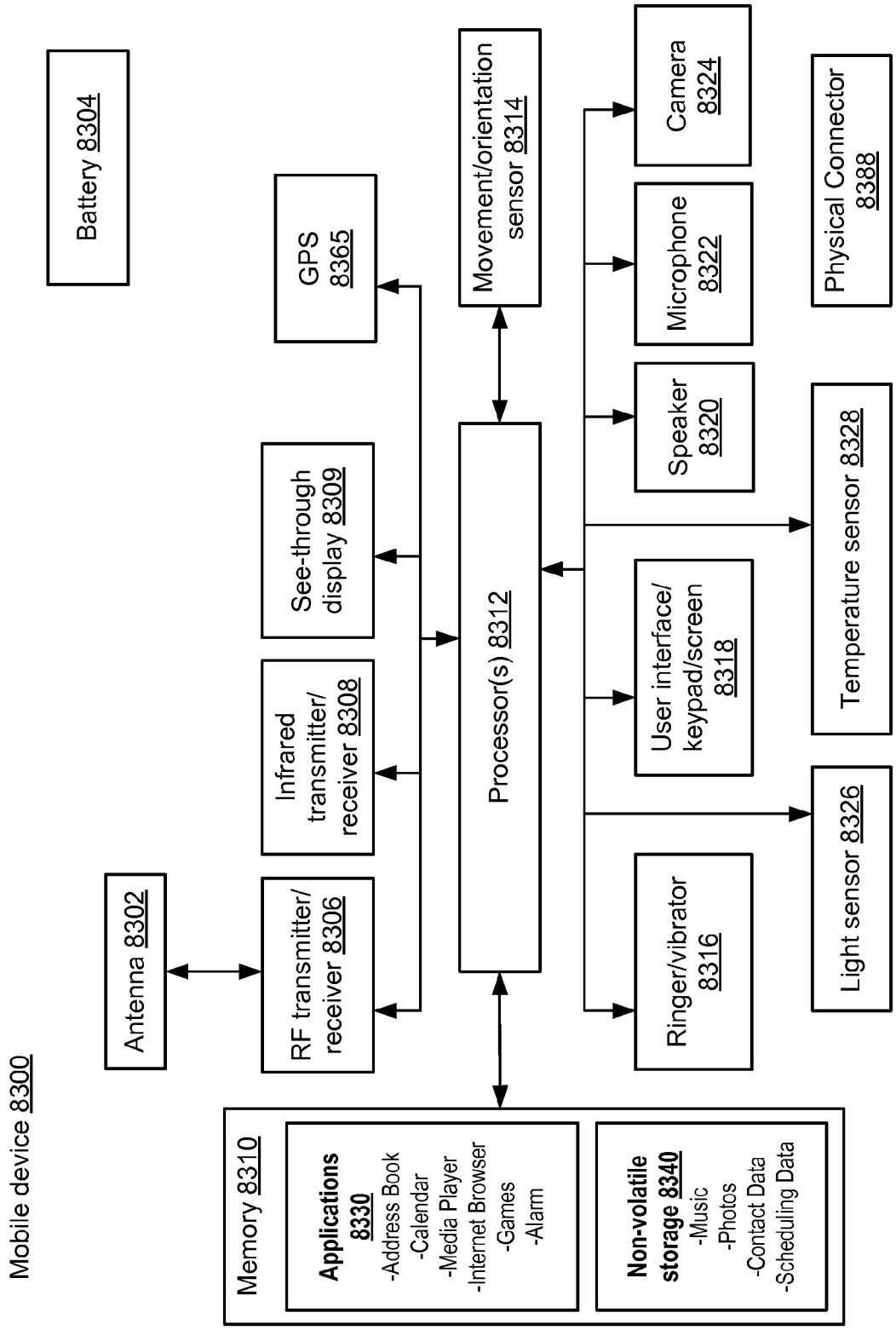
FIG. 6 is a block diagram of one embodiment of a mobile device.

FIG. 6 is a block diagram of one embodiment of a mobile device 8300, such as mobile device 19 in FIG. 1. Mobile devices may include laptop computers, pocket computers, mobile phones, HMDs, personal digital assistants, and hand-held media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

For purposes of this document, reference in the specification to "an embodiment," "one embodiment," "some embodiments," or "another embodiment" may be used to describe different embodiments and do not necessarily refer to the same embodiment.

For purposes of this document, the term "set" of objects refers to a "set" of one or more of the objects.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device for generating and controlling virtual objects within an augmented reality environment, comprising:

one or more processors configured to acquire one or more images of a portion of a real-world object and acquire a three-dimensional model of the real-world object, the one or more images include a color image and a depth image, the one or more processors configured to update at least a portion of the color image with interpolated pixel values derived from pixel values within the color image based on depth information from the depth image, the one or more processors configured to identify one or more specular reflections within the one or more images and generate a texture exemplar using the one or more images and the three-dimensional model of the real-world object, the one or more processors configured to generate the texture exemplar using the color image and the depth image such that the one or more specular reflections are substantially removed from the texture exemplar and such that distortions caused by a curved surface of the real-world object are corrected, the one or more processors configured to render images of a virtual object using the texture exemplar such that the virtual object appears to be at least partially covered with a virtual material corresponding with the texture exemplar, the one or more processors configured to generate the texture exemplar and render the images of the virtual object in real-time; and a display in communication with the one or more processors, the display configured to display the rendered images of the virtual object.

2. The electronic device of claim 1, wherein:

the one or more processors configured to identify one or more pixel values within the color image that are not part of the real-world object using the depth information from the depth image and update the one or more pixel values within the color image that are not part of the real-world object with the interpolated pixel values derived from other pixel values within the color image that are part of the real-world object.

3. The electronic device of claim 1, wherein:

the one or more processors configured to render the images of the virtual object using texture synthesis techniques.

4. The electronic device of claim 1, wherein:

the one or more processors configured to automatically generate the texture exemplar and render the images of the virtual object using the texture exemplar during run-time of an application;

the electronic device comprises a head-mounted display device; and the display comprises a see-through display.

5. The electronic device of claim 4, wherein:

the one or more processors configured to cause a virtual camera viewfinder to be displayed using the see-through display and acquire a first image of the one or more images corresponding with the virtual camera viewfinder.

6. The electronic device of claim 1, wherein:
the one or more processors configured to determine an orientation of the real-world object and generating the texture exemplar based on the orientation of the real-world object.

7. The electronic device of claim 1, wherein:
the texture exemplar comprises a two-dimensional texture image that depicts the virtual material.

8. A method for generating and controlling virtual objects within an augmented reality environment using a mobile device, comprising:
capturing one or more images of a portion of a real-world object using the mobile device, the one or more images include a color image and a depth image;
acquiring a three-dimensional model of the real-world object;
updating at least a portion of the color image with interpolated pixel values derived from pixel values within the color image based on depth information from the depth image;
identifying one or more specular reflections within the one or more images;
generating a texture exemplar using the one or more images and the three-dimensional model of the real-world object, the texture exemplar is generated such that the one or more specular reflections are substantially removed from the texture exemplar and such that distortions caused by a curved surface of the real-world object are corrected; and
rendering and displaying images of a virtual object using the mobile device such that the virtual object appears to be at least partially covered with a virtual material corresponding with the texture exemplar, the generating the texture exemplar and the rendering and displaying images of the virtual object are performed in real-time by the mobile device.

9. The method of claim 8, wherein:
the generating the texture exemplar includes unwarping the one or more images using the three-dimensional model of the real-world object such that distortions caused by the curved surface of the real-world object are corrected; and
the generating the texture exemplar and the rendering and displaying images of the virtual object are performed during run-time of an application running on the mobile device.

10. The method of claim 8, further comprising:
identifying one or more pixel values within the color image that are not part of the real-world object using the depth information from the depth image; and
updating the one or more pixel values within the color image that are not part of the real-world object with the interpolated pixel values derived from other pixel values within the color image that are part of the real-world object.

11. The method of claim 8, wherein:
the rendering and displaying images of the virtual object includes generating the images using texture synthesis techniques.

12. The method of claim 8, wherein:
the mobile device comprises a head-mounted display device.

13. The method of claim 12, further comprising:
projecting a virtual camera viewfinder using the head-mounted display device, the capturing one or more images of a portion of the real-world object includes capturing a first image of the one or more images corresponding with the virtual camera viewfinder.

14. The method of claim 8, further comprising:
determining an orientation of the real-world object, the generating a texture exemplar includes generating the texture exemplar based on the orientation of the real-world object.

15. The method of claim 8, wherein:
the texture exemplar comprises a two-dimensional texture image that depicts the virtual material.

16. The method of claim 8, wherein:
the identifying one or more specular reflections includes capturing two or more images of the portion of the real-world object from two or more different angles, aligning the two or more images with each other, and identifying one or more pixels within the two or more images that do not have corresponding pixel values within a threshold pixel value range.

17. The method of claim 8, further comprising:
determining a three-dimensional shape for the real-world object using surface reconstruction techniques.

18. One or more storage devices containing processor readable code for programming one or more processors to perform a method for generating and controlling virtual objects within an augmented reality environment using a head-mounted display device, the processor readable code comprising:
processor readable code configured to capture one or more images of a portion of a real-world object using the head-mounted display device, the one or more images include a color image and a depth image;
processor readable code configured to update at least a portion of the color image with interpolated pixel values derived from pixel values within the color image based on depth information from the depth image;
processor readable code configured to identify one or more specular reflections within the one or more images;
processor readable code configured to generate a texture exemplar using the one or more images such that the one or more specular reflections are substantially removed from the texture exemplar and such that distortions caused by a curved surface of the real-world object are corrected using the three-dimensional model of the real-world object; and
processor readable code configured to render and display images of a virtual object using the head-mounted display device such that the virtual object appears to be at least partially covered with a virtual material corresponding with the texture exemplar, the generation of the texture exemplar and the display of the images of the virtual object are performed in real-time by the head-mounted display device.

* * * * *